United States Patent
Farshizadeh et al.

(10) Patent No.: US 11,668,615 B2
(45) Date of Patent: Jun. 6, 2023

(54) METHOD FOR DETECTING DISTURBANCE VARIABLES IN A STEERING SYSTEM, AND STEERING SYSTEM FOR A MOTOR VEHICLE

(71) Applicant: ZF Automotive Germany GmbH, Alfdorf (DE)

(72) Inventors: Emad Farshizadeh, Düsseldorf (DE); Arno Luengen, Frechen (DE)

(73) Assignee: ZF Automotive Germany GmbH, Alfdorf (DE)

( * ) Notice: Subject to any disclaimer, the term of this patent is extended or adjusted under 35 U.S.C. 154(b) by 344 days.

(21) Appl. No.: 16/649,818

(22) PCT Filed: Sep. 21, 2018

(86) PCT No.: PCT/EP2018/075624
§ 371 (c)(1),
(2) Date: Mar. 23, 2020

(87) PCT Pub. No.: WO2019/057905
PCT Pub. Date: Mar. 28, 2019

(65) Prior Publication Data
US 2020/0290671 A1    Sep. 17, 2020

(30) Foreign Application Priority Data
Sep. 21, 2017   (DE) .......................... 102017121952.8

(51) Int. Cl.
*B62D 5/04*      (2006.01)
*G01L 5/22*      (2006.01)
(Continued)

(52) U.S. Cl.
CPC ................ *G01L 5/221* (2013.01); *B62D 1/16* (2013.01); *B62D 5/046* (2013.01); *B62D 5/0472* (2013.01);
(Continued)

(58) Field of Classification Search
None
See application file for complete search history.

(56) References Cited

U.S. PATENT DOCUMENTS 7,162,341 B2 * 1/2007 von Hammel ....... B62D 5/0469
                                                      180/443
9,061,701 B2 * 6/2015 Hales .................... B62D 5/0472
(Continued)

FOREIGN PATENT DOCUMENTS

CN      101691124 A          4/2010
CN      101691124 A  *       4/2010
(Continued)

*Primary Examiner* — Kevin R Steckbauer
(74) *Attorney, Agent, or Firm* — Robert James Harwood

(57) ABSTRACT

A steering system for a motor vehicle, having a steering column, an electromechanical steering assistance apparatus, a sensor which is assigned to the steering column and is configured to sense a torque and a rotational angle of the steering column, and a regulator, wherein the electromechanical steering assistance apparatus comprises a motor having an angular position encoder which is configured to sense the motor rotational angle of the motor, wherein the regulator is configured to determine a torque of the electromechanical steering assistance apparatus, and wherein the regulator is also configured to determine a disturbance variable, which gives rise to an undesired steering sensation, in the steering system by means of a Kalman filter.

11 Claims, 3 Drawing Sheets

(51) Int. Cl.
  *B62D 1/16*  (2006.01)
  *B62D 15/02* (2006.01)
  *B62D 6/00*  (2006.01)
  *G01L 3/10*  (2006.01)

(52) U.S. Cl.
  CPC .......... *B62D 5/0481* (2013.01); *B62D 6/008* (2013.01); *B62D 15/025* (2013.01); *B62D 15/0235* (2013.01); *G01L 3/10* (2013.01)

(56) References Cited

U.S. PATENT DOCUMENTS

| | | | |
|---|---|---|---|
| 9,102,352 B1 * | 8/2015 | Nierobisch | B62D 5/0472 |
| 9,108,669 B2 * | 8/2015 | Bean | B62D 5/0463 |
| 10,942,075 B2 * | 3/2021 | Oschlies | B62D 6/10 |
| 11,046,359 B2 * | 6/2021 | Shin | B62D 5/046 |
| 11,110,956 B2 * | 9/2021 | George | B62D 6/007 |
| 11,180,186 B2 * | 11/2021 | Pramod | B62D 15/025 |
| 11,299,198 B2 * | 4/2022 | Bourdrez | B62D 5/0472 |
| 2004/0098180 A1 * | 5/2004 | Von Hammel | B62D 5/0469 701/41 |
| 2010/0268418 A1 * | 10/2010 | Fernandez | B62D 5/0466 701/41 |
| 2012/0004807 A1 * | 1/2012 | Hales | B62D 6/00 701/41 |
| 2014/0303848 A1 * | 10/2014 | Bean | B62D 5/0472 701/41 |
| 2015/0232121 A1 * | 8/2015 | Nierobisch | B62D 5/0472 701/41 |
| 2016/0303485 A1 * | 10/2016 | Kawamura | B62D 6/003 |
| 2017/0350777 A1 * | 12/2017 | Oschlies | G01L 3/16 |
| 2019/0092377 A1 * | 3/2019 | Shin | H02P 6/16 |
| 2019/0256126 A1 * | 8/2019 | George | G01M 17/02 |
| 2019/0308659 A1 * | 10/2019 | Pramod | B62D 6/002 |
| 2020/0023889 A1 * | 1/2020 | Rohrmoser | B62D 5/0463 |
| 2020/0062292 A1 * | 2/2020 | Shin | B62D 5/0463 |
| 2020/0102006 A1 * | 4/2020 | Bourdrez | B62D 5/0463 |
| 2020/0140007 A1 * | 5/2020 | Farshizadeh | B62D 1/286 |
| 2020/0198693 A1 * | 6/2020 | Milbaier | B62D 15/0215 |
| 2020/0232859 A1 * | 7/2020 | Farshizadeh | B62D 1/286 |
| 2020/0269912 A1 * | 8/2020 | Lapis | B62D 6/006 |
| 2020/0290671 A1 * | 9/2020 | Farshizadeh | B62D 5/0481 |
| 2020/0361530 A1 * | 11/2020 | Polmans | B62D 6/10 |
| 2021/0171094 A1 * | 6/2021 | Farshizadeh | B62D 5/0463 |
| 2021/0269087 A1 * | 9/2021 | Zhao | B62D 15/021 |

FOREIGN PATENT DOCUMENTS

| | | | | |
|---|---|---|---|---|
| CN | 101691124 B | * | 6/2012 | |
| CN | 104520167 A | * | 4/2015 | B62D 5/04 |
| CN | 104520167 B | * | 4/2017 | B62D 5/04 |
| CN | 107140012 A | * | 9/2017 | |
| CN | 107458466 A | * | 12/2017 | B62D 15/025 |
| CN | 108657270 A | * | 10/2018 | B62D 5/001 |
| CN | 109955898 A | * | 7/2019 | B62D 3/12 |
| CN | 110182253 A | * | 8/2019 | B62D 5/006 |
| CN | 110341786 A | * | 10/2019 | B62D 15/025 |
| CN | 107458466 B | * | 12/2019 | B62D 15/025 |
| CN | 110573405 A | * | 12/2019 | B62D 1/286 |
| CN | 110573406 A | * | 12/2019 | B62D 1/286 |
| CN | 110861701 A | * | 3/2020 | B60W 10/20 |
| CN | 111094109 A | * | 5/2020 | B62D 1/16 |
| CN | 111094110 A | * | 5/2020 | B62D 1/20 |
| CN | 111661137 A | * | 9/2020 | B62D 1/28 |
| CN | 110606121 B | * | 2/2021 | |
| CN | 111661137 B | * | 4/2021 | B62D 1/28 |
| CN | 112896296 A | * | 6/2021 | B62D 5/0463 |
| CN | 111204371 B | * | 9/2021 | B62D 5/0463 |
| CN | 110182253 B | * | 11/2021 | B62D 5/006 |
| CN | 109955898 B | * | 4/2022 | B62D 3/12 |
| CN | 114954640 A | * | 8/2022 | |
| DE | 102009028647 A1 * | | 2/2011 | B62D 15/025 |
| DE | 102010014802 A1 * | | 10/2011 | B62D 6/008 |
| DE | 102010014802 A1 | | 10/2011 | |
| DE | 102012104253 A1 * | | 7/2013 | B62D 5/0472 |
| DE | 102014105088 A1 * | | 10/2015 | B62D 5/0472 |
| DE | 102014105088 A1 | | 10/2015 | |
| DE | 102012104253 B4 * | | 7/2016 | B62D 5/0472 |
| DE | 102016209833 A1 * | | 12/2017 | B62D 15/025 |
| DE | 102017110548 A1 * | | 11/2018 | B62D 1/286 |
| DE | 102017110549 A1 * | | 11/2018 | B62D 1/286 |
| DE | 102017121952 A1 * | | 3/2019 | B62D 1/16 |
| DE | 102017217084 A1 * | | 3/2019 | B62D 1/20 |
| DE | 102018123615 A1 * | | 3/2019 | B62D 5/005 |
| DE | 102017128554 A1 * | | 6/2019 | B62D 5/001 |
| DE | 102017222776 A1 * | | 6/2019 | B62D 3/12 |
| DE | 102019104169 A1 * | | 8/2019 | B62D 5/006 |
| DE | 102016209833 B4 * | | 10/2019 | B62D 15/025 |
| DE | 102019109006 A1 * | | 10/2019 | B62D 15/025 |
| DE | 102019212712 A1 * | | 2/2020 | B60W 10/20 |
| DE | 102019133025 A1 * | | 6/2021 | B62D 5/0463 |
| DE | 102020201516 A1 * | | 8/2021 | |
| DE | 102017217084 B4 * | | 3/2022 | B62D 1/20 |
| DE | 102020212259 A1 * | | 3/2022 | |
| DE | 102021209380 B3 * | | 5/2022 | |
| EP | 2402234 A2 * | | 1/2012 | B62D 5/0463 |
| EP | 2402234 A2 | | 1/2012 | |
| EP | 2402234 A3 * | | 6/2012 | B62D 5/0463 |
| EP | 2402234 B1 * | | 8/2013 | B62D 5/0463 |
| EP | 2771224 B1 * | | 3/2016 | B62D 5/0463 |
| FR | 2929222 A1 * | | 10/2009 | B62D 5/006 |
| GB | 2496298 A | * | 5/2013 | B62D 5/0463 |
| JP | 2019001270 A | * | 1/2019 | B60Q 9/00 |
| JP | 2019104486 A | * | 6/2019 | B62D 3/12 |
| JP | 6826091 B2 * | | 2/2021 | B62D 3/12 |
| JP | 6926705 B2 * | | 8/2021 | B60Q 9/00 |
| WO | WO-2007060135 A1 * | | 5/2007 | B60T 8/1708 |
| WO | WO-2011020631 A1 * | | 2/2011 | B62D 15/025 |
| WO | WO-2013060896 A1 * | | 5/2013 | B62D 5/0463 |
| WO | WO-2014021369 A1 * | | 2/2014 | B62D 5/04 |
| WO | WO-2018210635 A1 * | | 11/2018 | B62D 1/286 |
| WO | WO-2018210638 A1 * | | 11/2018 | B62D 1/286 |
| WO | WO-2019057905 A1 * | | 3/2019 | B62D 1/16 |
| WO | WO-2019063176 A1 * | | 4/2019 | B62D 1/20 |
| WO | WO-2020125249 A1 * | | 6/2020 | B62D 15/021 |
| WO | WO-2022069146 A1 * | | 4/2022 | |

* cited by examiner

METHOD FOR DETECTING DISTURBANCE VARIABLES IN A STEERING SYSTEM, AND STEERING SYSTEM FOR A MOTOR VEHICLE

CROSS-REFERENCE TO RELATED APPLICATION

This application is a national stage of International Application No. PCT/EP2018/075624, filed Sep. 21, 2018, the disclosure of which is incorporated herein by reference in its entirety, and which claimed priority to German Patent Application No. 102017121952.8, filed Sep. 21, 2017, the disclosure of which is incorporated herein by reference in its entirety.

TECHNICAL FIELD

The invention relates to a method for detecting disturbance variables in steering systems and to a steering system for a motor vehicle.

BACKGROUND

Motor vehicles which have a steering system with an electromechanical steering assistance apparatus are known from the prior art, wherein the electromechanical steering assistance apparatus can make available a torque in order thereby to assist the steering movement of the driver of the motor vehicle. An electromechanical steering assistance apparatus can be embodied as a power steering system.

During the operation of the motor vehicle, in particular the steering system, disturbances occur which give the driver of the motor vehicle an undesired steering sensation, since undesired steering excitations occur, for example friction-based disturbances of the electromechanical steering assistance apparatus, in particular of the motor which is used and/or friction-based disturbances of the steering system in general, for example of the steering gear which is used, for example from the road via the wheels. In the prior art, these disturbance variables either cannot be sensed at all or can only be sensed with a large amount of expenditure (by means of a correspondingly large number of sensors). For example, the friction-based disturbance variables cannot be sensed via sensors on the drive side or on the output side.

It has proven disadvantageous here that the sensing and compensation of the disturbance variables is possible only to a certain extent and in addition the costs for the compensation of the disturbance variables which can be sensed are high, since, inter alia, a very large number of sensors have to be used to detect the different disturbing influences.

SUMMARY

The object of the invention is to make available a steering system for a motor vehicle and a method for detecting disturbance variables with which the disturbance variables can be sensed easily and cost-effectively.

The object is achieved according to the invention by a method for detecting disturbance variables in a steering system, wherein the steering system has a steering column and an electromechanical steering assistance apparatus, comprising the following steps: sensing at least one variable of the steering system, modeling at least one part of the steering system by means of a mathematical state space model which comprises at least the variable, and estimating at least one disturbance variable in the steering system by means of a Kalman filter, which disturbance variable gives rise to undesired steering excitations, wherein the Kalman filter uses the state space model of the steering system to estimate the disturbance variable.

The basic concept of the invention is that the disturbance variables which act on the steering system are estimated by means of the mathematical state space model so that said variables do not have to be sensed directly by a sensor, which is not possible in any case for all disturbance variables. As a result, the corresponding costs for the numerous sensors can be eliminated and at the same time a more precise overall disturbance can be determined, since disturbance variables are estimated which cannot be sensed by sensors. In this respect, the disturbance variables which act on the steering system can be determined more accurately.

The at least one disturbance variable which is estimated by means of the Kalman filter is, in particular, a variable which cannot be sensed by sensors and/or a variable which cannot be sensed by measuring equipment.

The at least one disturbance variable can accordingly not be determined by means of sensors which are provided, but rather can only be estimated.

In other words, the at least one disturbance variable which is estimated by means of the Kalman filter is not a state variable.

The at least one disturbance variable is a friction torque, a force which originates from the road and which acts, for example, on the steering rack, and/or a friction force, for example at the steering rack.

In contrast, a rotational angle or angles, a rotational angular speed or speeds, a travel value or values and/or a speed or speeds, for example of the steering rack, are state variables which actually differ from the at least one disturbance variable.

One aspect provides that the at least one estimated disturbance variable is used by a compensation unit to compensate the disturbance, corresponding to the disturbance variable, by means of a compensation variable. This makes it possible to correspondingly actively compensate the undesired steering excitations which are associated with the disturbance variable, so that improved steering sensation is provided for the driver of the vehicle. The undesired steering excitations which otherwise occur are correspondingly eliminated so that they can no longer be perceived by the driver of the vehicle. The operating comfort is correspondingly increased owing to the improved driving sensation. As a result, the safety can also be increased since, for example, it is possible to compensate a disturbance which would cause the steering wheel to tear off if a pothole or the like is traveled over.

In particular, the compensation variable is an additional torque which is made available by the electromechanical steering assistance apparatus in order to compensate the disturbance corresponding to the disturbance variable. Consequently, an additional torque is made available which compensates the corresponding estimated disturbances, in particular the disturbance variable corresponding to the disturbance. The additional torque can be correspondingly made available by the electromechanical steering assistance apparatus which is present in any case so that no additional components are required to effectively compensate the undesired steering excitations which occur.

According to a further aspect, the compensation unit comprises frequency-dependent filters and/or characteristic diagrams which can be adjusted in order simultaneously to generate a desired steering sensation during the compensation of the estimated disturbance variables. Correspondingly, it is possible to determine state-dependent compensation variables which are calculated by means of the correspondingly adjustable filters and/or characteristic diagrams.

In particular, at least one measurement variable of the motor vehicle is sensed and used to determine the compensation variable. By means of the measurement variable of the motor vehicle, which can also be measured by means of a sensor, it is accordingly possible to adjust the compensation variable in accordance with the corresponding measurement variable of the motor vehicle.

For example, the at least one measurement variable of the motor vehicle is used to adjust the frequency-dependent filters and/or characteristic diagrams. Accordingly, the compensation unit can use not only the estimated disturbance variable but also the at least one measurement variable of the motor vehicle as well as a previously measured measurement variable of the steering system to determine the compensation variable.

In particular, the at least one measurement variable of the motor vehicle is a vehicle speed and/or steering variable. The steering variable can be a steering angle, a steering angular speed and/or a steering angular acceleration which are correspondingly sensed. Accordingly, the steering variable is associated with the steering movement which is performed by the driver of the vehicle, for example. Alternatively or additionally, the vehicle speed is taken into account in order to adjust the filters and/or characteristic diagrams. The compensation variable can therefore be determined in accordance with the steering variable and the vehicle speed, and additionally in accordance with the determined disturbance variable.

According to one embodiment, a lower part, comprising at least the electromechanical steering assistance apparatus, of the steering system is modeled by means of the mathematical state space model. This lower part is sufficient to be able to estimate the disturbance variables which occur and which occur as a result of friction-based disruption of the electromechanical steering assistance apparatus and/or of the steering gear originating from the road.

In particular, the lower part of the steering system comprises all the components of the steering system which are provided underneath a sensor which is assigned to the steering column. Accordingly, the disturbances which originate from the road or the corresponding implementation can be estimated. In particular it is possible to differentiate these disturbances from the disturbances which occur on the drive side.

According to a further aspect, the at least one variable comprises a rotational angle of the steering system, a motor rotational angle of the electromechanical steering assistance apparatus, a torque of the electromechanical steering assistance apparatus and/or a torque of the steering column. These four variables can all be used in the mathematical state space model to estimate the corresponding disturbance variables. In this context, the different variables can be used as input variables in the corresponding state space model of an observer which is formed by the Kalman filter. The rotational angle of the steering system is, for example, a rotational angle of a lower region of the steering system which is measured underneath a torsion rod which is provided in the steering system. Generally, the rotational angle of the steering system can be the rotational angle of the steering column.

The variables can be measurement variables such as is the case, for example, with the rotational angle of the steering system and the torque of the steering column. In addition, the variables can be determined indirectly from measurement variables such as is the case for the torque of the electromechanical steering assistance apparatus. The torque of the electromechanical steering assistance apparatus can be determined indirectly, specifically by means of the currents of an electric motor of the electromechanical steering assistance apparatus. The variables which are to be considered as measurement variables all have in common the fact that they are measured by means of a correspondingly assigned sensor which is assigned to the steering system, wherein the corresponding sensors are not suitable for determining the estimated disturbance variables themselves. In this respect, no additional sensors are used to sense directly the disturbance variables or the disturbances which are assigned to the disturbance variables. Instead, the corresponding disturbance variables or disturbances are estimated by means of the Kalman filter and the sensors which are present in any case.

In addition, the invention relates to a steering system for a motor vehicle, having a steering column, an electromechanical steering assistance apparatus, a sensor which is assigned to the steering column and is configured to sense a torque and a rotational angle of the steering column. The electromechanical steering assistance apparatus comprises a motor having an angular position encoder which is configured to sense the motor rotational angle of the motor. In addition, the steering system comprises a regulator which is configured to determine a torque of the electromechanical steering assistance apparatus, wherein the regulator is also configured to determine a disturbance variable, which can give rise to an undesired steering sensation, in the steering system by means of a Kalman filter. Accordingly, with the steering system it is possible to estimate the disturbance variables which occur in the steering system and which adversely affect the steering sensation, without using an additional sensor for this. The corresponding disturbance variables are correspondingly determined or estimated by means of the Kalman filter. Accordingly, a cost-effective steering system is provided which, with a compact design, nevertheless makes available additional information which cannot be sensed, for example, by means of sensors.

In particular, the steering system is configured also to compensate the disturbance variable in the steering system, which disturbance variable gives rise to an undesired steering sensation. This ensures that the driver of the vehicle is not also affected by the disturbances. The steering sensation is correspondingly improved.

BRIEF DESCRIPTION OF THE FIGURES

Further advantages and properties of the invention can be found in the following description and the drawings to which reference is made. In the drawings.

DETAILED DESCRIPTION

Figure 1:
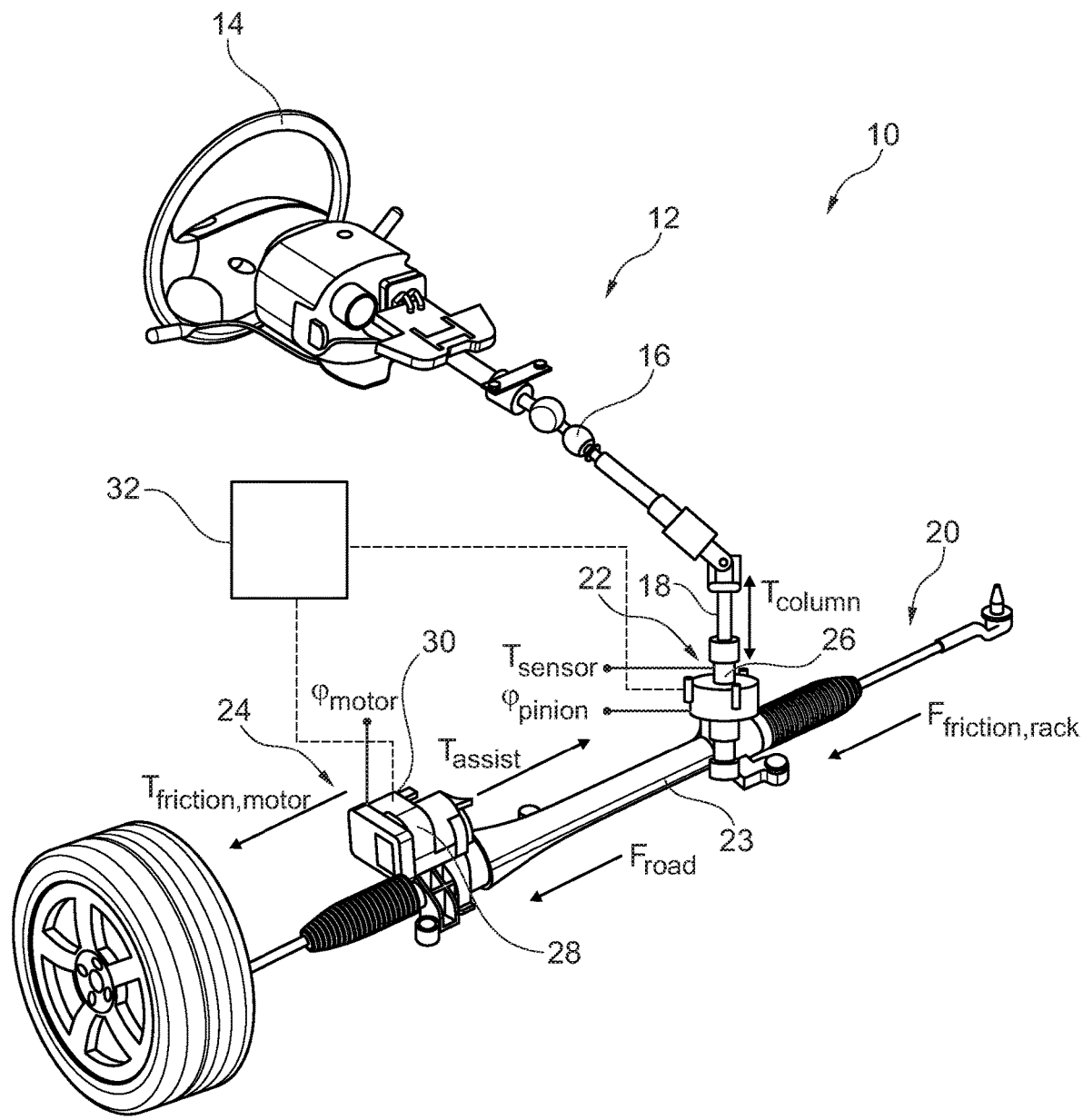
FIG. 1 shows a perspective view of an inventive steering system of a motor vehicle.

FIG. 1 shows a steering system 10 of a motor vehicle which is embodied as an electromechanically assisted steering system.

The steering system 10 comprises an upper part 12 which comprises a steering wheel 14, a first steering column 16 and at least one part of a second steering column 18, as well as a lower part 20 which comprises at least one part of the second steering column 18, a measuring device 22, a steering rack 23 and an electromechanical steering assistance apparatus 24.

If the driver applies a torque to the steering wheel 14, the first steering column 16 and the second steering column 18 are as a result rotated, which is correspondingly detected by the measuring device 22 which is assigned to the second steering column 18. The measuring device 22 has for this purpose a so-called torque and angle sensor 26, which is also referred to as a torque angle sensor (TAS). The measuring device 22 is integrated, for example, in the second steering column 18, so that the second steering column 18 comprises an input section and a corresponding output section, in particular wherein the second steering column 18 is embodied in two parts.

The torque and angle sensor 26 comprises, for example, a torsion rod by means of which the angle and the torque which occurs at the steering column 16, 18 can be correspondingly sensed. The sensing of the angle can take place on a side of the torsion rod directed toward the steering wheel 14 or on a side of the torsion rod directed toward the steering rack 23.

The electromechanical steering assistance apparatus 24 comprises a motor 28 and an angular position encoder 30 by means of which the motor rotational angle of the motor 28 can be sensed. The motor 28 is, in particular, an electric motor.

Moreover, the steering system 10 comprises a regulator 32 which is coupled to the measuring device 22 and to the electromechanical steering assistance apparatus 24.

The regulator 32 accordingly receives, inter alia, the rotational angle of the steering column 16, 18 via the sensor 26, the torque of the steering column 16, 18 via the sensor 26, the motor rotational angle of the motor 28 via the angular position encoder 30 and the torque of the electromechanical steering assistance apparatus 24 via the corresponding power consumption of the motor 28. The torque of the steering column 16, 18 can be a torsion rod torque.

In addition, the regulator 32 is configured to apply a mathematical state space model of the observer 34, which model is designed, in particular, for the lower part 20 of the steering system 10.

Figure 2:
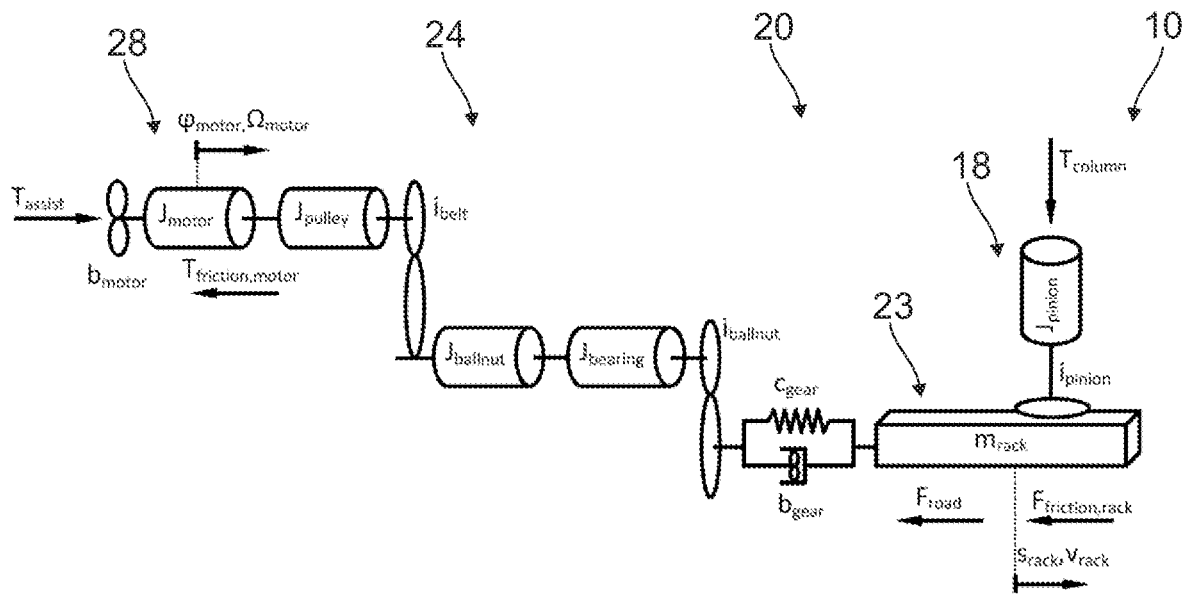
FIG. 2 shows a physical equivalent model of a lower part of the steering system from FIG. 1.
Figure 3:
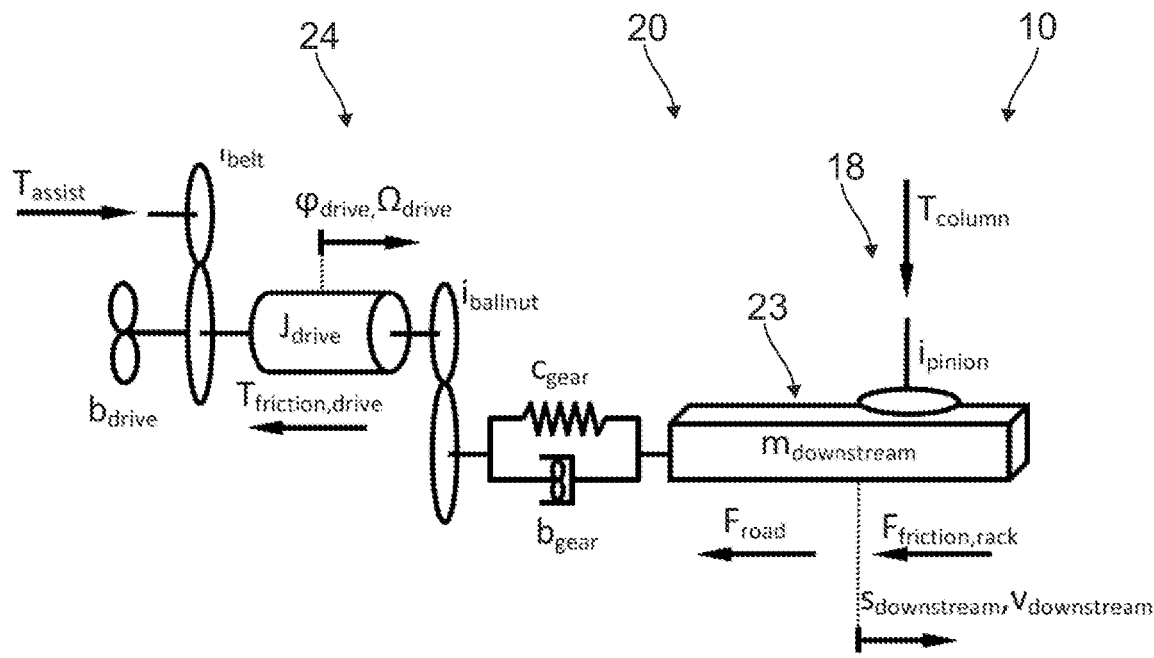
FIG. 3 shows a simplified physical equivalent model of the lower part of the steering system from FIG. 1.
Figure 4:
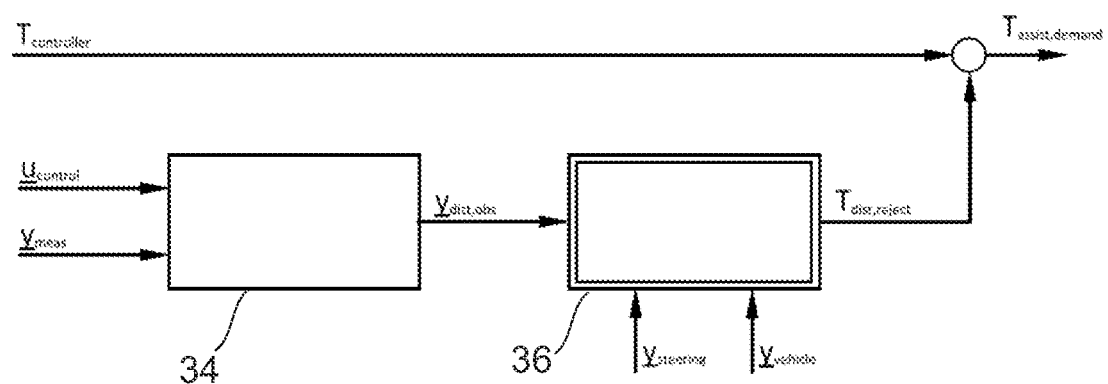
FIG. 4 shows a schematic illustration of the inventive steering system with which the method according to the invention is clarified.

For the design of the observer 34 (Kalman filter), the lower part 20 of the steering system 10 is modeled in accordance with the simplified physical equivalent model which is shown in FIG. 3 and is based on the physical equivalent model according to FIG. 2, said model being, for example, of a steering system 10 with a ball screw drive. However, other types of steering systems can be provided in an analogous fashion.

In this equivalent model, the electromechanical steering assistance apparatus 24, in particular its components, and the mechanical components of the steering system 10, in particular the second steering column 18 and the steering rack 23, are modeled by means of corresponding masses, moments of inertia, springs with a spring constant, material damping with damping coefficients and the viscous friction.

Specifically, the electromechanical steering assistance apparatus 24 is modeled by means of the moments of inertia of the motor ($J_{motor}$), of the pulley ($J_{pulley}$), of the recirculating ball nut ($J_{ballnut}$) and of the ball bearing ($J_{bearing}$), wherein in addition viscous friction ($b_{motor}$) is taken into account for the bearing friction of the motor 28. In addition, the transmission ratio of the belt drive ($i_{belt}$) and the transmission ratio of the ball screw drive ($i_{ballnut}$) are taken into account.

With respect to the steering system 10, the mass of the steering rack 23 ($m_{rack}$) and the elastic connection of the electromechanical steering assistance apparatus 24 to the steering rack 23 are taken into account as a spring ($c_{gear}$) with the material damping ($b_{gear}$) in the state space model. Likewise, the moment of inertia of the lower part 20 of the steering system 10, that is to say that of the second steering column 18 with the pinion ($J_{pinion}$) and the corresponding transmission ratio ($i_{pinion}$) are input into the state space model.

In addition, it is apparent from FIG. 2 that with respect to the electromechanical steering assistance apparatus 24 the torque of the steering column 16, 18 ($T_{column}$), the applied torque ($T_{assist}$), the electromechanical steering assistance apparatus 24 and the friction torque ($T_{friction,motor}$) which occurs as a disturbance variable are included as further input variables or disturbance variables within the electromechanical steering assistance apparatus 24.

Furthermore, the force which originates from the road and the force ($F_{road}$) which acts on the steering rack 23 and the friction force at the steering rack 23 ($F_{friction,rack}$) are included as disturbance variables in the state space model.

The rotational angle ($\varphi_{motor}$) and the rotational angular speed ($\Omega_{motor}$) of the motor 28 of the electromechanical steering assistance apparatus 24 as well as the travel ($s_{rack}$) and the speed ($v_{rack}$) of the steering rack 23 are included as state variables in the state space model.

The physical equivalent model which is shown in FIG. 2 is illustrated for the design of the observer 34 as in FIG. 3, but in a simplified form.

Correspondingly, the various moments of inertia of the electromechanical steering assistance apparatus 24 are combined to form a total moment of inertia ($J_{drive}$) of the drive side. In addition, the total friction torque ($T_{friction,drive}$) of the drive side is used. The mass of the steering rack ($m_{rack}$) and the moment of inertia ($J_{pinion}$) of the steering column are combined to form a total mas ($m_{downstream}$) on the output side.

On the basis of the simplified physical equivalent model of the steering system 10, in particular the lower part 20 of the steering system 10, illustrated in FIG. 3, equations can be derived which form the mathematical state space model of the lower part 20 of the steering system 10. This mathematical state space model is explained in more detail below.

A state of the steering system 10 is modeled with the state space model, wherein the state is generally understood to be a minimum set of variables $\vec{x}$ which is required to describe the corresponding system, that is to say the steering system 10. Here, the state of the steering system 10 is correspondingly considered. This results in the following for the state variables:

$$\vec{x} = \begin{pmatrix} \varphi_{drive} \\ \Omega_{drive} \\ s_{downstream} \\ v_{downstream} \end{pmatrix}$$

A time dependence of the corresponding state is not presented explicitly below but rather tacitly assumed. The time evolution of the state of the steering system 10 is given by the following equation:

$$\dot{\vec{x}} = A\vec{x} + B\vec{u} = A\vec{x} + B[\vec{u}_{control} \vec{u}_{dist}] \quad \text{(equation 1)}$$

This equation is a differential equation or a difference equation depending on whether a continuous time evolution or a discrete time evolution is considered. In this context, $\vec{u}_{control} = [T_{assist} \ T_{sensor}]^T$, that is to say the torque applied to the electromechanical steering assistance apparatus 24 and the torque sensed by the measuring device 20 at the second steering column 18, which torque differs from the torque of the steering column 16, 18 ($T_{column}$) by the missing portion of the material damping.

In addition, $\vec{u}_{dist} = [T_{friction,drive} \ F_{rack}]^T$ and comprises the drive-side dry frictional torque as $T_{friction,drive}$ and the sum of the force resulting from the roadway excitations and the output-side dry frictional force as $F_{rack} = F_{road} + F_{friction,rack}$.

Accordingly, $\vec{u}_{dist}$ represents the unknown disruptions of the state which occur in the lower part 20 of the steering system 10.

The matrices A and B describe the evolution of the state $\vec{x}$ and are dependent on the variables of the mathematical state space model.

Furthermore, it becomes apparent from the mathematical state space model that the measured motor rotational angle $\varphi_{motor}$ and the rotational angle $\varphi_{pinion}$ of the second steering column 18 can also be described by means of the corresponding state of the steering system 10 as follows:

$$\vec{y}_{meas} = C\vec{x} = \begin{pmatrix} \varphi_{motor} \\ \varphi_{pinion} \end{pmatrix} \quad \text{(equation 2)}$$

In this context, the matrix C describes the relationship between the current state $\vec{x}$ of the steering system 10 and the measured motor rotational angle $\varphi_{motor}$ as well as the rotational angle $\varphi_{pinion}$ of the second steering column 18.

Together with the above equation (1) for the time evolution of the state of the steering system 10 the equation (2) forms a linear state space model for the state of the steering system 10.

It is not possible to infer the state variables of the steering system 10 and the corresponding disturbance variables $\vec{u}_{dist}$ directly from the determination of the corresponding variables, that is to say of the motor rotational angle of the electromechanical steering assistance apparatus 24, the rotational angle of the second steering column 18, from the torque of the electromechanical steering assistance apparatus 24 or the torque of the second steering column 18.

Instead, the state variables of the steering system 10 and the disturbance variables $\vec{u}_{dist}$ have to be estimated.

For this purpose, a Kalman filter is used. Said Kalman filter estimates the state variables of the steering system 10 and the unknown disturbance variables of the mathematical state space model on the basis of the determined variables of the steering system 10 and the selected mathematical state space model.

To be more precise, the Kalman filter estimates the disturbances $T_{friction,drive}$ acting on the lower part 20 of the steering system 10 as well as $F_{rack}$, wherein, as already mentioned, $T_{friction,drive}$ describes the drive-side dry frictional torque and $F_{rack} = F_{road} + F_{friction,rack}$ describes the sum of the force resulting from roadway excitations and the output-side dry frictional force.

Therefore, all the additionally required variables which are necessary to determine the disturbance variables are estimated by means of the Kalman filter. To be more precise, all of the variables which are not measured and which are required to calculate the disturbance variables of the steering system 10 and all of the non-measurable variables which are required for this purpose are estimated.

In other words, the method described above is based on the observer 34 in the sense of the regulation technology, in which method the steering system 10 is modeled by a mathematical state space model. This mathematical state space model serves as a basis for the design of the observer 34 which is assigned to the lower part 20 of the steering system 10.

Unknown state and disturbance variables are estimated, as described above, from known input and measurement variables $\vec{u}_{control}$ and $\vec{y}_{meas}$ by the observer 34 ("lower observer").

The disturbance variables $\vec{y}_{dist,obs}$ are calculated therefrom as output variables which correspond to all the disturbances which occur.

These estimated disturbance variables $\vec{y}_{dist,obs}$ are subsequently used by a compensation unit 36 to determine a compensation variable $T_{dist,reject}$ which compensates the disturbances which are assigned to the disturbance variables $\vec{y}_{dist,obs}$.

Here, in this context at least one measurement variable of the motor vehicle can be fed to the compensation unit 36 in addition to the disturbance variables $\vec{y}_{dist,obs}$ determined by means of the observer 34, said measurement variable being used to calculate the compensation variable $T_{dist,reject}$. The measurement variable of the motor vehicle can be a vehicle movement dynamics measurement variable (for example of the vehicle speed) $\vec{y}_{vehicle}$ and/or a steering variable $\vec{y}_{steering}$, for example an applied steering torque, a steering angle, a steering angle speed and/or a steering angle acceleration.

The compensation unit 36 can comprise frequency-dependent filters and/or characteristic diagrams which are adjustable. The filters or characteristic diagrams can be dependent here on corresponding measurement variables of the motor vehicle $\vec{y}_{vehicle}$, $\vec{y}_{steering}$, so that the adjustable filters and/or characteristic diagrams are correspondingly adjusted by means of the measurement variables of the motor vehicle in order to determine the compensation variable $T_{dist,reject}$ in accordance with the measurement variables of the motor vehicle.

An additional torque, which constitutes the compensation variable $T_{dist,reject}$, is calculated by means of the compensation unit 36 in order to compensate the disturbances corresponding to the estimated disturbance variables $\vec{y}_{dist,obs}$, that is to say the torque and the force at the steering rack 23 which generate the undesired steering sensation. The additional torque $T_{dist,reject}$ is applied here by the electromechanical steering assistance apparatus 24, so that the undesired steering excitations which occur from the road and/or for friction-based disruptions of the lower part 20 of the steering system 10 are correspondingly compensated, as a result of which the driver of the motor vehicle does not perceive said disruptions and has an improved steering sensation.

With the method according to the invention and the steering system 10 it is possible easily to determine and compensate disturbance variables which occur, without using numerous sensors for this purpose.

The invention claimed is:

1. A method for detecting disturbance variables in a steering system having a steering column and an electromechanical steering assistance apparatus, comprising the following steps:
   sensing at least one variable of the steering system,
   modeling at least one part of the steering system by means of a mathematical state space model which comprises the at least one variable, and
   estimating at least one disturbance variable comprised of at least one of a friction torque and a friction force in the steering system by means of a Kalman filter, wherein the at least one disturbance variable gives rise to undesired steering excitations, wherein the Kalman filter uses the state space model of the steering system to estimate the at least one disturbance variable.

2. The method as claimed in claim 1, wherein the at least one estimated disturbance variable is used by a compensation unit to compensate the disturbance, corresponding to the at least one disturbance variable, by means of a compensation variable.

3. The method as claimed in claim 2, wherein the compensation variable is an additional torque which is made available by the electromechanical steering assistance apparatus in order to compensate the disturbance corresponding to the at least one disturbance variable.

4. The method as claimed in claim 2, wherein the compensation unit comprises frequency-dependent filters and/or characteristic diagrams which can be adjusted in order to generate a desired steering sensation.

5. The method as claimed in claim 4, wherein at least one measurement variable of the motor vehicle is sensed and used to determine the compensation variable.

6. The method as claimed in claim 4, wherein at least one measurement variable of the motor vehicle is sensed and used to determine the compensation variable.

7. The method as claimed in claim 5, wherein the at least one measurement variable of the motor vehicle is used to adjust the frequency-dependent filters and/or characteristic diagrams.

8. The method as claimed in claim 5, wherein the at least one measurement variable of the motor vehicle is a vehicle speed and/or steering variable.

9. The method as claimed in claim 8, wherein a lower part, comprising at least the electromechanical steering assistance apparatus, of the steering system is modeled by means of the mathematical state space model.

10. The method as claimed in claim 8, wherein the lower part of the steering system comprises all the components of the steering system which are provided underneath a sensor which is assigned to the steering column.

11. The method as claimed in claim 9, wherein the at least one variable comprises a rotational angle of the steering system, a motor rotational angle of the electromechanical steering assistance apparatus, a torque of the electromechanical steering assistance apparatus and/or a torque of the steering column.

* * * * *